(12) United States Patent
Dasari et al.

(10) Patent No.: US 7,577,653 B2
(45) Date of Patent: Aug. 18, 2009

(54) REGISTRATION SYSTEM AND DUPLICATE ENTRY DETECTION ALGORITHM

(75) Inventors: Srinivas V. Dasari, Scottsdale, AZ (US); Kevin T. Harvey, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 300 days.

(21) Appl. No.: 10/609,845

(22) Filed: Jun. 30, 2003

(65) Prior Publication Data

US 2004/0267743 A1   Dec. 30, 2004

(51) Int. Cl.
*G06F 17/30* (2006.01)
(52) U.S. Cl. .................... 707/6; 707/5; 706/45
(58) Field of Classification Search ............ 707/6, 707/5; 706/45
See application file for complete search history.

(56) References Cited

U.S. PATENT DOCUMENTS

| | | | |
|---|---|---|---|
| 5,497,486 A | | 3/1996 | Hernandez et al. |
| 5,845,285 A | * | 12/1998 | Klein .................. 707/101 |
| 6,636,850 B2 | * | 10/2003 | Lepien .................. 707/6 |
| 2002/0099649 A1 | * | 7/2002 | Lee et al. ............... 705/38 |

OTHER PUBLICATIONS

"Immunization Registries DeDuplication and Record Matching"; written by Michael S. Garcia, Matthew Keller; published by Scientific Technologies Corporation; dated from 1999.*
"Linking Client Records from Substance Abuse, Mental Health and Medicaid State Agencies"; written by Daniel Whalen et al.; published by U.S. Deparment of Health and Human Services; dated from Jul. 2001.*
Whalen D., et al.: "Linking Client Records from Substance Abuse, Mental Health and Medicaid State Agencies", p. 9—par. 1; p. 21—last par.; p. 23—par.1.; p. 29—last par (Jul. 2001)..
Garcia M. S., et al.: "Immunization Registries De Duplication and Record Matching" pp. 1-11 (1999).
Newcombe, H.B.: "Handbook of Record Linkage. Passage Methods for Health and Statistical Studies, Administration and Business" pp. 4-33 (1988).
Elfeky, M.G., et al. *Institute of Electrical and Electronics Engineers*, "Tailor: A Record Linkage Toolbox" Proceedings 18th. International Conference on Data Engineering (ICDE2002) San Jose, Feb. 26-Mar. 1, 2002, International Conference on Data Engineering. (ICDE), Los Alamitos, CA: IEEE Comp. Soc, US, vol. conf. 18, pp. 17-28 (Feb. 26, 2002).
International Search Report for PCT/US2004/020477 (Sep. 23, 2004).

* cited by examiner

*Primary Examiner*—Apu M Mofiz
*Assistant Examiner*—Monica M Pyo
(74) *Attorney, Agent, or Firm*—Fitzpatrick, Cella, Harper & Scinto

(57) ABSTRACT

An algorithm for facilitating recognition of duplicative entries of merchant information in a system to prevent, for example, multiple registrations of a merchant by a transaction card company. The algorithm incorporates scoring, weighting and pattern matching to automatically approve, automatically reject or refer for manual review applications for registration in real-time.

20 Claims, 5 Drawing Sheets

FIG. 2

| | Approval Patterns | | |
|---|---|---|---|
| | Pattern One (26) | Pattern Two (28) | Pattern Three (30) |
| Name: | N | N | - |
| Address: | N | N | - |
| Zip Code: | - | - | - |
| Phone Number: | N | N | - |
| Authorized Signer Name: | N | N or U | N |
| Authorized Signer Social Security Number: | N or U | N | N |
| Business Identification Number: | N | N | N |
| Bank Account Number: | N | N | N |
| Transaction Card Number: | N | N | N |

FIG. 3

Rejection Patterns

| | Pattern One | Pattern Two | Pattern Three | Pattern Four | Pattern Five | Pattern Six |
|---|---|---|---|---|---|---|
| Name: | Y | Y | Y | Y | Y | Y |
| Address: | Y | Y | Y | Y | Y | Y |
| Zip Code: | Y | Y | Y | Y | Y | Y |
| Phone Number: | - | - | Y | Y | Y | Y |
| Authorized Signer Name: | Y | Y | - | - | Y | Y |
| Authorized Signer Social Security Number: | Y | Y | Y | Y | - | - |
| Business Identification Number: | - | Y | - | Y | - | Y |
| Bank Account Number: | Y | - | Y | - | Y | - |
| Transaction Card Number: | - | - | - | - | - | - |

US 7,577,653 B2

REGISTRATION SYSTEM AND DUPLICATE ENTRY DETECTION ALGORITHM

TECHNICAL FIELD

The present subject matter relates to registration an algorithm for identifying whether incoming information is duplicative of existing information stored in a database. More specifically, the algorithm facilitates recognition of duplicative entries of merchant information in a database to prevent, for example, multiple registrations of a merchant by a transaction card company.

BACKGROUND

It may be desirable for a transaction card company to employ external sales agents to register merchants to accept payment for goods and services via the transaction card, thereby enabling customers to pay the registered merchants for goods and services using the company's transaction cards. The registration process includes acquiring merchant information and storing that information for identification and other purposes.

Use of multiple external sales agents complicates the registration process. For example, duplicative registrations occur when one or multiple agents register a single merchant more than once over a period of time. Duplicative registrations can cost the transaction card company duplicative commission fees, cause technology performance problems and contribute to, or enable, fraudulent activity. As a result, managing the enrollment of merchants can be burdensome.

Accordingly, there is a need for a method of identifying and preventing duplicative merchant registrations.

SUMMARY

The present subject matter relates to an algorithm for identifying duplicative entries in a database. More specifically, the algorithm facilitates recognition of duplicative entries of merchant information in a database to prevent, for example, multiple registrations of a merchant by a transaction card company.

An objective is to provide an algorithm for identifying duplicative information in a database.

Another objective is to provide an algorithm utilizing scoring, weighting and pattern matching to identify duplicative information in a database.

A further objective is to automate merchant registration approvals and rejections.

Another objective is to provide an algorithm for identifying duplicative information in a database that is sufficiently efficient to be run in real-time.

A further objective is to improve cost control and activation rate for merchant registrations through the elimination of duplicative registrations and redundant commissions.

Yet another objective is to provide a cost effective, flexible and reusable generic system for identifying duplicative information within a database system.

Additional objects, advantages and novel features of the examples will be set forth in part in the description which follows, and in part will become apparent to those skilled in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2 illustrates a table of approval patterns for the system of FIG. 1.

FIG. 3 illustrates a table of rejection patterns for the system of FIG. 1.

DETAILED DESCRIPTION

Figure 1:
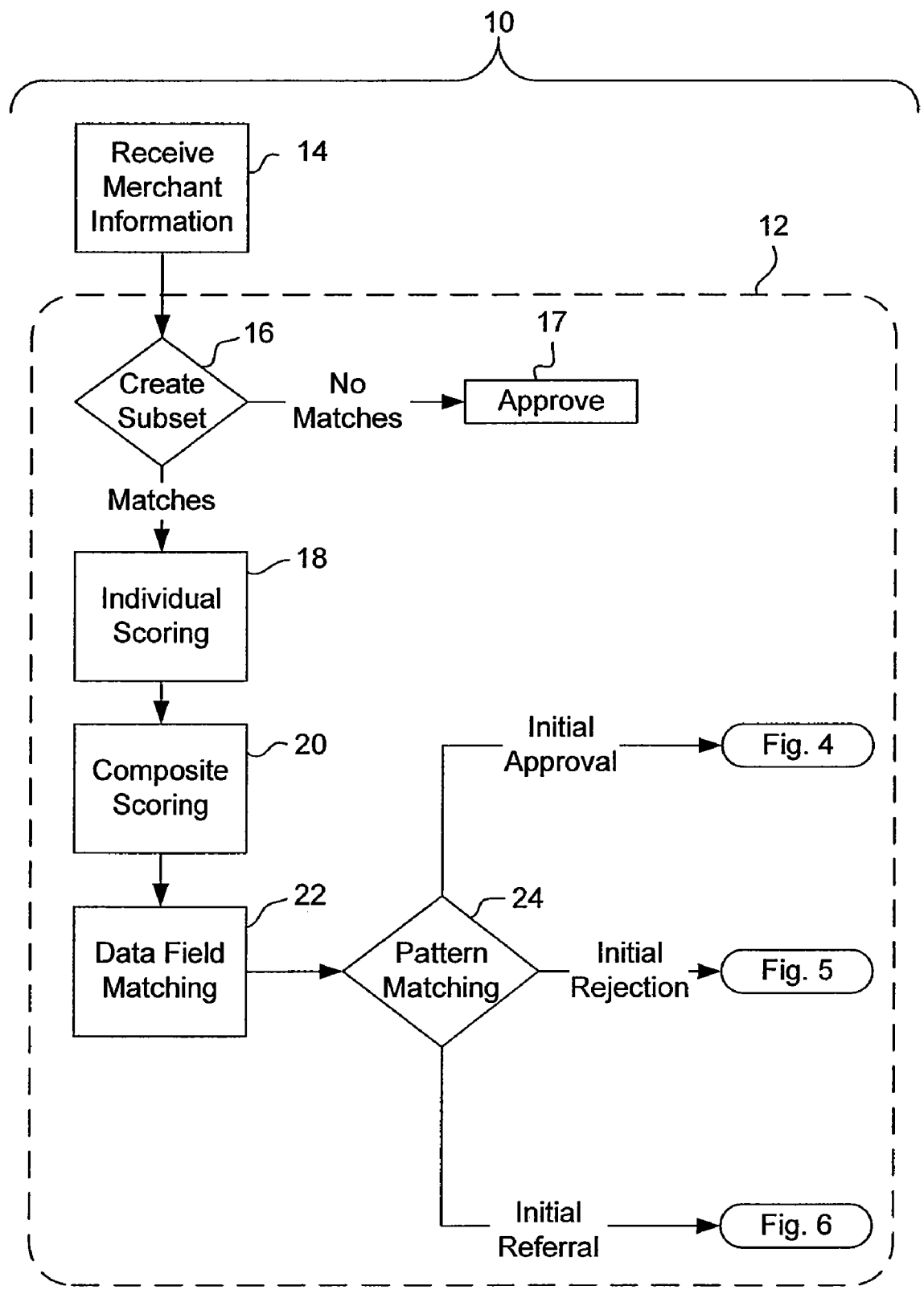
FIG. 1 illustrates a system for identifying duplicative entries in a database.

FIG. 1 illustrates a system 10 for identifying duplicative entries in one or more databases. The system 10 may be utilized as shown in FIG. 1, for example, to identify duplicate merchant registrations. As shown in FIG. 1, the system 10 receives merchant registration information and runs a duplicate detection algorithm 12 to approve or reject the merchant registration. The system 10 can be a computer system which runs software that controls data acquisition, data processing, data transmission and data storage, as well as execution of the algorithm.

As described herein, many of the functions relating to the system 10 may be implemented on a computer or computers, which of course may be connected for data communication via components of a network. The hardware of such computer platforms typically is general purpose in nature, albeit with an appropriate network connection for communication via the intranet, the Internet and/or other data networks.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse, a trackball, etc. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network. The elements of such a general-purpose computer system also may be combined with or built into routing elements or nodes of the network.

The software functionalities (e.g., many of the steps shown in the flow charts of FIG. 1) involve programming of software, including executable code as well as associated stored data. The software code is executable by the general-purpose computer that functions as the particular computer. In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable medium. Execution of such code by a processor of the computer platform enables the platform to implement the enrollment process 10, in essentially the manner performed in the embodiments discussed and illustrated herein.

As used herein, terms such as computer or machine readable medium refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s). Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Turning now to FIG. 1, a merchant may be registered in the system 10 by supplying merchant registration information to be entered into the system 10 via a receive merchant information step 14. The merchant registration information may be entered, for example, by an external sales agent, a customer service representative or by a merchant. The merchant registration information may be input in any suitable manner, for example, as described above, via a networked computer application, such as, a dial-up client server application or through the Internet.

The merchant registration information may include a plurality of data fields and may be stored in an order (i.e., application) database. For example, the merchant registration information may include data fields such as; the merchant's name, the merchant's street address, the merchant's zip code, the merchant's phone number, the name of the authorizer signer for the merchant, the authorizer signer's social security number, the merchant's business identification number (such as, for example, the business identification number provided by The D&B Corporation under the trademark D&B D-U-N-S Number), the merchant's bank account number, and the merchant's transaction card number. The merchant registration information may also include additional data, such as, for example, the merchant's e-mail address and other identification information.

After storing the merchant registration information in the order database, the system 10 performs the duplicate detection algorithm 12 shown in FIG. 1. The duplicate detection algorithm 12 includes a series of steps executed in sequence whereby the merchant registration information received by the system 10 via the receive merchant information step 14 is compared to the existing merchant data files stored in a merchant database, as well as other merchant data files stored in the order database. The comparison is made to determine if the new or incoming merchant registration information is duplicative of existing merchant data information already stored on the system. Based on the results of the comparisons made via the duplicate detection algorithm 12, the incoming merchant registration information may be approved, rejected or referred for manual review.

In the first step of the duplicate detection algorithm 12, a subset of the merchant data files is created via a create subset step 16. The subset includes the merchant data files that are most likely to be duplicative of the incoming merchant registration. The subset may be formed by compiling merchant data files containing data fields that exactly match a characteristic portion of the merchant registration information entered via the receive merchant information step 14. For example, the subset may be formed of all merchant data files wherein the first four characters of the first word in the merchant's name, the first three characters in the second word of the merchant's name and the first three digits of the merchant's zip code match the information entered via the receive merchant information step 14, or the first four characters of the merchant's address and the first three digits of the merchant's zip code match the information entered via the receive merchant information step 14. Alternatively, other data fields, or portions of data fields, may be utilized to form the subset of merchant data files via the initial cut step 16. When comparing names, whether business names or personal names, standard character strings such as, for example, mr, mrs, ms, dr, inc, co, ltd, llc, etc. may be ignored in the comparison.

If no merchant data files are identified as meeting the create subset step 16 criteria, the merchant registration information input via the receive merchant information step 14 is approved, i.e., considered as not being a duplicate, via an approve step 17, as discussed further below. If merchant data files are identified as meeting the create subset step 16 criteria, the subset is formed and the duplicate detection algorithm 12 performs a further evaluation of the merchant data files in the subset.

Each data field of each merchant data file in the subset is compared to the corresponding data field in the merchant registration information to determine whether the merchant registration information is duplicative. As shown in FIG. 1, a matching percentage, or score, is calculated for each of the data fields in the subset of merchant data files via an individual scoring step 18. The score is determined by calculating the number of matching characters in the data fields being compared, dividing by the length of one of the character strings being compared and multiplying by one hundred. The score may be determined by dividing the number of matching characters between the two data strings by the number of characters in the longer of the data strings. Generally, when determining the score for data fields containing names and addresses, characters from each data string are matched without considering the position of the character in the string. However, each character from either data string may only be matched once.

As describe above in relation to the create subset step 16, when comparing names, whether business names or personal names, standard character strings such as, for example, mr, mrs, ms, dr, inc, co, ltd, llc, etc. may be ignored in the comparison. Further, when comparing names, the name score may be determined by taking the highest percentage of the comparison of names across different data fields when multiple name fields are stored. For example, the name score may be calculated by comparing an input doing business name against a previously stored doing business name, the input doing business name against a previously stored corporate business name, an input corporate business name against the previously stored doing business name, or the input corporate business name against the previously stored corporate business name. For example, if the input name is "cooking cow girl" and the previously stored name is "cookin cow girl inc", the "inc" is ignored and the score is calculated as thirteen matches divided by fourteen characters in the longer of the two data strings, or 92.8%, for a score of 92.8.

Similarly, when comparing addresses, standard character strings such as, for example, rd, ave, dr, ln, ct, north, south, east, west, etc. may be ignored in the comparison. When comparing addresses, it may be beneficial to calculate the score by using the shorter data string length as the denominator. Separate address data strings may be provided, for example, for address line one and address line two. Accordingly, the address score may be calculated by taking the highest percentage of the comparison of any combination of the address lines. For example, the address score may be calculated by comparing the input address line one against the previously stored address line one, the input address line one against the previously stored address line two, the input address line two against the previously stored address line one, or the input address line two against the previously stored address line two.

In the embodiment of the duplicate detection algorithm 12 shown in FIG. 1, zip code, phone number, social security, business identification number, bank account number and transaction card number comparisons may be matched positionally, i.e., matched considering the position of each character. For example, the score of the comparison of an input zip code of 85260 to a previously stored zip code of 85206 is three divided by five, or 60%, for a score of 60.

As shown in FIG. 1, a composite score is calculated via a composite scoring step 20. The composite score is calculated by weighting the individual scores calculated via the individual scoring step 18. For example, in the embodiment shown in FIG. 1, the composite score may be calculated by adding the name score, eight times the address score, the zip code score, twice the phone number score, eight times the authorized signer score, sixteen times the authorized signer's social security number score, the business identification score, sixteen times the bank account number and the transaction card account number. The weighting factors for the composite scoring step 20 may be adjusted based on the intended application of the system 10. Further, the weighting factors may be stored in a control table to enable the weighting factors to be adjusted.

As further shown in FIG. 1, after a composite score has been calculated via the composite scoring step 20, each of the data fields of each of the previously stored merchant data files are defined as matching, non-matching or undefined via a data field match step 22. A predetermined matching score is provided for each data field and, each data field is determined to be matching, or non-matching, based on whether the individual score for that data field meets or exceeds the predetermined match score. For example, in the embodiment shown in FIG. 1, the data field for the merchant's address is matching when it has a score of at least 80. Similarly, the data field for the merchant's zip code score and the authorized signer's name score must also be at least 80 to match. Further, the phone number score must be at least 90 to match, and the authorized signer's social security number score, business identification number score, bank account number score and transaction card number score must be 100 to match. The matching score is calculated to provide a statistically relevant definition of matching and may vary based on the application of the system 10. If a data field is empty or missing in either the input data field or the previously stored data field, the data field is determined to be undefined. Accordingly, each data field for each merchant data file in the subset is determined to be either matching, non-matching or undefined via the data field match step 22.

After the data field match step 22 is complete, the merchant registration information is analyzed via a pattern matching step 24. The pattern matching step 24 analyses the data fields from the subset of previously stored merchant data files using predetermined data field patterns, as shown in FIGS. 2 and 3. The pattern matching step 24 makes use of the matching, non-matching and undefined definitions derived from data field match step 22. The merchant data files are analyzed via the pattern matching step 24 and the merchant registration information is sorted into one of three initial categories; an initial approval category, an initial rejection category and an initial referral category.

For example, FIG. 2 shows a table that illustrates three approval patterns. As shown in pattern one 26 and pattern two 28 of FIG. 2, if the name, address, phone number, authorized signer name, authorized signer social security number, business identification number, bank account number and transaction card number for a merchant data files are all determined to not match the input data file, the merchant registration information is sorted into the initial approval category. As further shown in FIG. 2, in pattern one 26, the merchant registration information is sorted into the initial approval category if the authorized signer social security number is undefined and the name, address, phone number, authorized signer name, business identification number, bank account number and transaction card number for a merchant data files are all determined to not match the input data file. Similarly, in pattern two 28, the merchant registration information is sorted into the initial approval category if the authorized signer name is undefined and the name, address, phone number, authorized signer social security number, business identification number, bank account number and transaction card number for a merchant data files are all determined to not match the input data file. As shown in pattern three 30 in FIG. 2, the merchant registration information is sorted into the initial approval category if the authorized signer social security number, business identification number, bank account number and transaction card number are all non-matching.

Similarly, FIG. 3 shows a table that illustrates six rejection patterns. If any of the six patterns shown in FIG. 3 are matched via the pattern matching step 26, the merchant registration information is sorted into the initial rejection category. For example, in pattern one 32 of FIG. 3, if the name, address, zip code, authorized signer name, authorized signer social security number and bank account number of a merchant data file are all determined to be matching with an input data file, the merchant registration information is sorted into the initial rejection category.

Further, if the pattern matching step 26 provides conflicting initial approval and initial rejection sorting commands, or no initial approval/initial rejection patterns are matched, the merchant registration information is sorted to an initial referral category.

After the pattern matching step 26 has sorted the merchant registration information into the initial approval, the initial rejection or the initial referral categories, the merchant registration information is subjected to a scoring step 34. The scoring step 34 analyzes the result of the pattern matching step 26 using the composite score generated in the composite scoring step 20.

Figure 4:
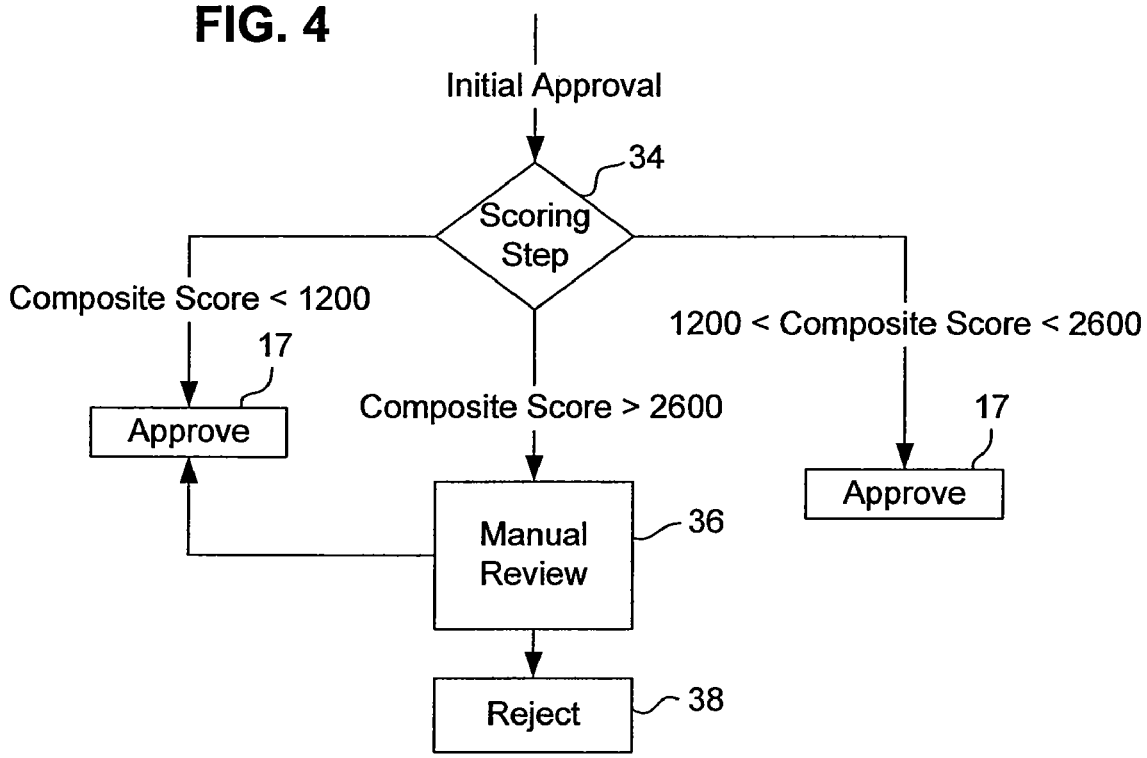
FIG. 4 illustrates the initial approval step shown in FIG. 1.
Figure 5:
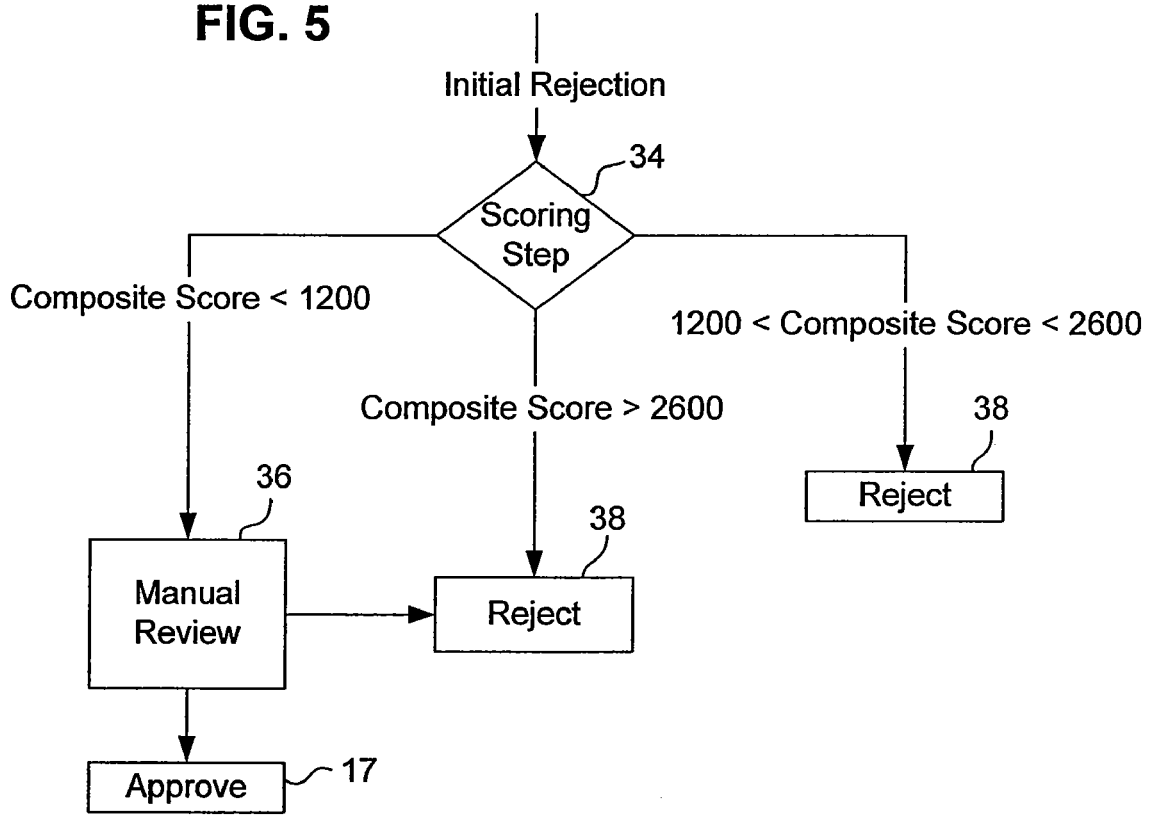
FIG. 5 illustrates the initial rejection step shown in FIG. 1.
Figure 6:
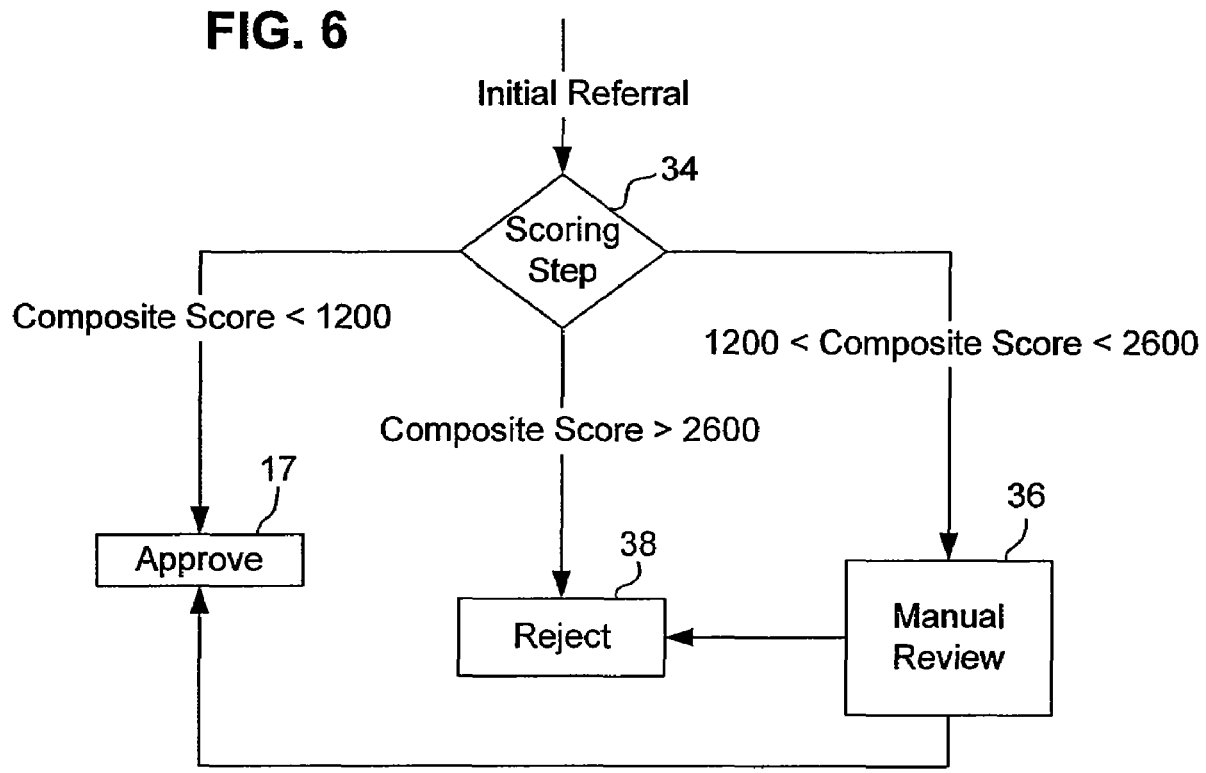
FIG. 6 illustrates the initial referral step shown in FIG. 1.

The logic of the scoring step 34 is shown in FIGS. 4-6. As shown in FIG. 4, if the merchant registration information has been sorted into the initial approval category and the composite score is less than or equal to 2600, the merchant registration information is considered to not be a duplicate entry and is then approved via the approve step 17. Conversely, if the merchant registration information has been sorted into the initial approval category and the composite score is greater than 2600, the merchant registration information is referred for manual review via a manual review step 36.

As shown in FIG. 5, if the merchant registration information has been sorted into the initial rejection category and the composite score is greater than or equal to 1200, the merchant registration information is considered a duplicate entry and rejected via a reject step 38. Conversely, if the merchant registration information has been sorted into the initial rejection category and the composite score is less than 1200, the merchant registration information is referred for manual review via a manual review step 36.

As shown in FIG. 6, if the merchant registration information has been sorted into the initial referral category and the composite score is less than 1200, the merchant registration information is considered not to be a duplicate entry and is approved via the approve step 17. Conversely, if the merchant registration information has been sorted into the initial referral category and the composite score is greater than or equal to 2600, the merchant registration information is considered a duplicate entry and rejected via the reject step 38. Further, if the merchant registration information has been sorted into the initial referral category and the composite score is greater than or equal to 1200, but less than 2600, the merchant registration information is referred for manual review via a manual review step 36.

As shown in FIG. 1, if the merchant registration information is neither approved nor rejected via the scoring step 34, the merchant registration information is referred to a customer service representative for manual review via the manual review step 36. If the merchant registration information is entered, for example, by an external sales agent or customer via a dial-up client server application or through the Internet, the external sales agent or customer may be provided a phone number or website to contact a customer service representative to perform the manual review step 36. The merchant registration information may then be manually approved or rejected by the customer service representative via the approve step 17 or the reject step 38, respectively.

If the merchant registration information is approved via the approve step 17, whether after the create subset step 16, the scoring step 34 or the manual review step 36, the merchant registration information is transferred to the merchant database. Regardless of whether the merchant registration information is approved or rejected, the merchant registration information may remain in the order database for a period of time to enable an operator to override the approval or rejection. For example, it may be beneficial to provide a sixty day period of time in which the merchant registration information may remain in the order database, after which the merchant registration information may be purged from the order database.

When the subset generated via the create subset step 16 includes multiple merchant data files, the individual scoring step 18, the composite scoring step 20, the data field match step 22, the pattern matching step 24 and the scoring step 34 are repeated for each of the merchant data files in the subset. The final disposition of the merchant registration information is based on the outcome of all of the comparisons of the merchant data files in the subset. The merchant registration information will be rejected via the reject step 38 if any of the merchant data files results in a rejection. If there are no rejections, the merchant registration information will be referred via the manual review step 36 if any of the merchant data files result in a referral. If there are only approvals, the merchant registration information is approved via the approve step 17. For example, if the subset includes three merchant data files and the duplicate merchant algorithm 12 generates one approval, one referral and one rejection, the merchant registration information is rejected via the reject step 38. If the duplicate merchant algorithm 12 generates two approvals and one referral, the merchant registration information is referred via the manual review step 36. If each of the merchant data files in the subset result in an approval, the merchant data file is approved via the approve step 17.

While the foregoing has described what are considered to be the best mode and/or other examples, it is understood that various modifications may be made therein and that the technology disclosed herein may be implemented in various forms and examples, and that they may be applied in numerous applications, only some of which have been described herein. It is intended by the following claims to claim any and all modifications and variations that fall within the true scope of the advantageous concepts disclosed herein.

We claim:

1. A method, which is implemented by a computer including a processor, of comparing a first and second data entry, each data entry having a plurality of data fields, in a database system comprising the steps of:

calculating, by the processor, a matching percentage score for each data field by comparing each data field of the first data entry with a corresponding data field of the second data entry;

combining each of said matching percentage scores to produce a composite score;

defining each of said data fields as being in a category from at least a matching category, a non-matching category, and an undefined category using said matching percentage scores;

defining a plurality of predetermined patterns, each predetermined pattern corresponding respectively to a subset of the plurality of data fields, each data field of the patterns set to at least one of said matching category, said non-matching category and said undefined category;

comparing, by the processor, each category of each of said data fields to said predetermined patterns to make an initial determination whether said data entries are in a category from a set of categories including at least initial approval and initial rejection; and using both said composite score and said initial determination to generate final comparison results.

2. The method of claim 1 wherein said data fields comprise at least one of name, address, zip code, phone number, authorized signer name, authorized signer social security number, business identification number, bank account number and transaction card number fields.

3. The method of claim 1 wherein said matching percentage score for at least one of said data fields is determined by the percentage of matching characters, irrespective of character position, in said data field between the first and second data entry.

4. The method of claim 1 wherein said matching percentage score for at least one of said data fields is determined by the percentage of matching characters, based on a positional analysis, in said data field between the first and second data entry.

5. The method of claim 1 wherein said matching percentage score is determined by the percentage of matching characters in said data field between the first and second data entry, ignoring standard character strings.

6. The method of claim 1 wherein the step of comparing said categories of each of said data fields to predetermined patterns to make an initial determination whether the data entries are in a category from a set of categories including at least initial approval and initial rejection further comprises making an initial determination whether the data entries are in a category from a set of categories including at least initial approval, initial rejection, and initial referral.

7. The method of claim 1 wherein the step of using both said composite scoring results and said initial determination to generate final comparison results further comprises generating final comparison results in at least one of said matching category and said non-matching category.

8. The method of claim 1 wherein the step of using both said composite scoring results and said initial determination to generate final comparison results further comprises generating final comparison results in at least one of said matching category, said non-matching category and said undefined category.

9. The method of claim 1 wherein said method is performed on a computer system.

10. A method, which is implemented by a computer including a processor, of identifying whether a data entry input is duplicative of any existing data entries in a database system comprising the steps of:
   providing a database of existing data entries, each data entry having a plurality of data fields;
   receiving an incoming data entry having a plurality of data fields corresponding to said data fields of said existing data entries;
   creating a subset of said existing data entries having characteristic data within said existing entry data fields that is similar to characteristic data within said incoming data entry;
   calculating, by the processor, a matching percentage score corresponding to each said data field of each said existing data entry in said subset by comparing each data field of said incoming data entry to each corresponding data field of each of said existing data entries in said subset;
   combining each of said matching percentage scores to produce a composite score for each said existing data entry in said subset;
   defining each of said existing data fields in said subset as being in a category from at least a matching category, a non-matching category and an undefined category using said matching percentage scores;
   defining a plurality of predetermined patterns, each predetermined pattern corresponding respectively to a subset of the plurality of data fields, each data field of the patterns set to at least one of said matching category, said non-matching category and said undefined category;
   comparing, by the processor, each category of each of said data fields to said predetermined patterns to make an initial determination whether said existing data entries are in a category from a set of categories including at least initial approval and initial rejection; and
   using both said composite score and said initial determination to determine whether said incoming data entry is duplicative of any of said existing data entries in the database system.

11. The method of claim 10 wherein said data fields comprise at least one of name, address, zip code, phone number, authorized signer name, authorized signer social security number, business identification number, bank account number and transaction card number fields.

12. The method of claim 10 wherein said matching percentage score for at least one of said data fields is determined by the percentage of matching characters, irrespective of character position, in said data field.

13. The method of claim 10 wherein said matching percentage score for at least one of said data fields is determined by the percentage of matching characters, based on a positional analysis, in said data field.

14. The method of claim 10 wherein said matching percentage is determined by the percentage of matching characters in said data field, ignoring standard character strings.

15. The method of claim 10 wherein the step of comparing said definitions of each of said data fields to predetermined patterns to make an initial determination whether the data entries are in a category from a set of categories including at least initial approval and initial rejection further comprises making an initial determination whether the data entries are in a category from a set of categories including at least initial approval, initial rejection and initial referral.

16. The method of claim 10 wherein the step of using both said composite scoring results and said initial determination to generate final comparison results further comprises generating final comparison results in at least one of said matching category and said non-matching category.

17. The method of claim 10 wherein the step of using both said composite scoring results and said initial determination to generate final comparison results further comprises generating final comparison results in at least one of said matching category, said non-matching category and said undefined category.

18. The method of claim 10 wherein said method is performed on a computer system.

19. A method, which is implemented by a computer including a processor, method of comparing data in a database system comprising the steps of:
   providing a first data entry having data fields including name, address, zip code, phone number, authorized signer name, authorized signer social security number, business identification number, bank account number and transaction card number;
   providing a second data entry having data fields including name, address, zip code, phone number, authorized signer name, authorized signer social security number, business identification number, bank account number and transaction card number;
   calculating, by the processor, a matching percentage score for each data field by comparing each data field of each of said first data entry and said second data entry;
   multiplying said matching percentage by one hundred to generate a matching score corresponding to each data field;
   combining each of said matching scores to produce a composite score for each said data entry;
   defining each of said data fields as being in a category from at least a matching category, a non-matching category and an undefined category using said matching scores;
   defining a plurality of predetermined patterns, each predetermined pattern corresponding respectively to a subset of the plurality of data fields, each data field of the patterns set to at least one of said matching category, said non-matching category and said undefined category;
   comparing, by the processor, each category of each of said data fields to said predetermined patterns to make an initial determination whether the data entries are in a category from a set of categories including at least initial approval and initial rejection; and
   using both said composite score and said initial determination to make a final determination in a category from a set of categories including at least matching and non-matching.

20. The method of claim 19 wherein said method is performed on a computer system.

* * * * *